March 7, 1933.  F. W. GODSEY, JR  1,900,706
VEHICLE DRIVING APPARATUS AND SYSTEM
Filed Aug. 19, 1929
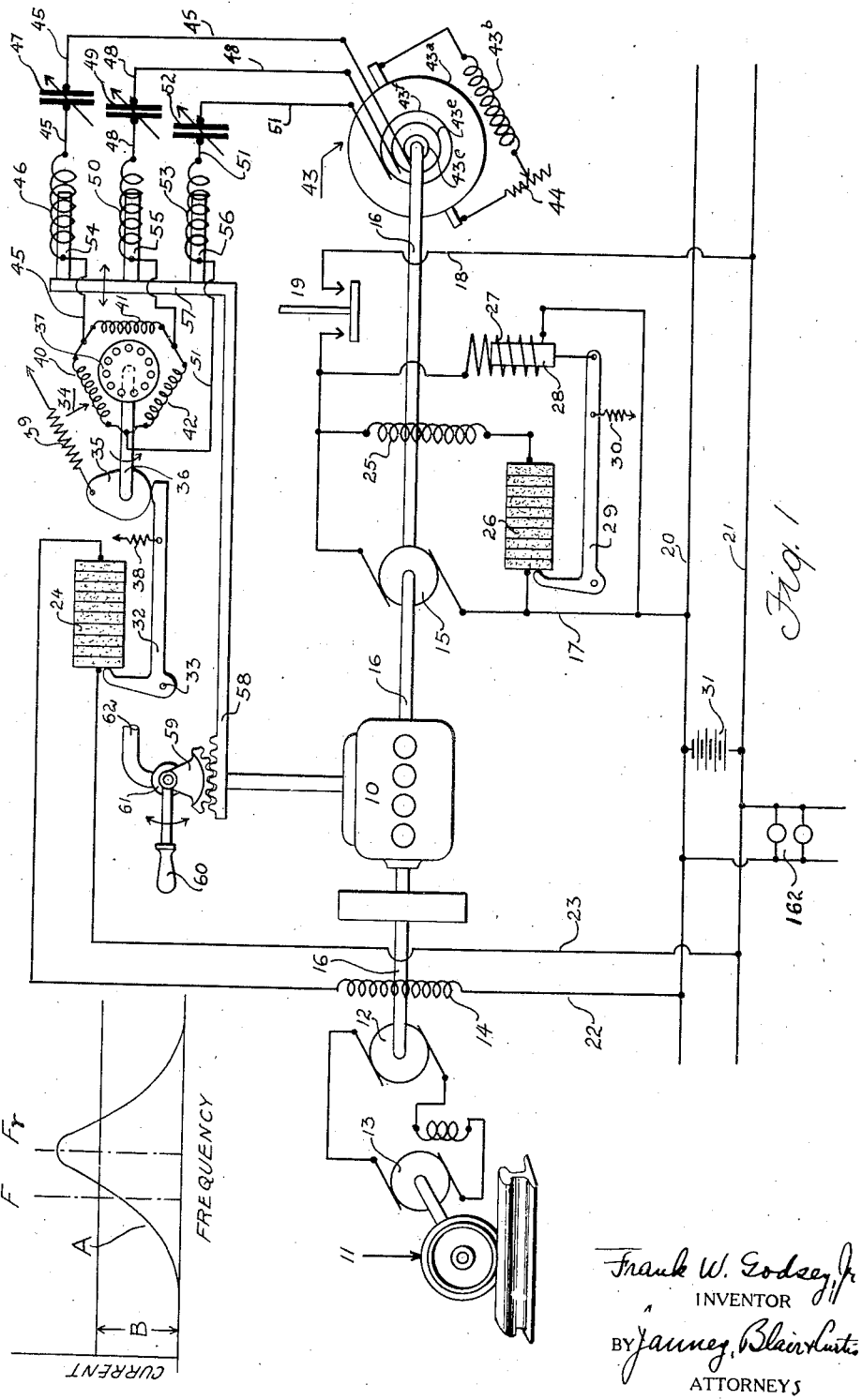

Patented Mar. 7, 1933

1,900,706

UNITED STATES PATENT OFFICE

FRANK W. GODSEY, JR., OF NEW HAVEN, CONNECTICUT, ASSIGNOR TO THE SAFETY CAR HEATING & LIGHTING COMPANY, A CORPORATION OF NEW JERSEY

VEHICLE DRIVING APPARATUS AND SYSTEM

Application filed August 19, 1929. Serial No. 387,052.

This invention relates to the transmission of power.

One of the objects of this invention is to provide a system of power transmission that will be thoroughly practical, fully automatic in operation, of efficient action, and capable of inexpensive embodiment in practical form. Another object is to provide a system and apparatus for transmitting power from a prime mover, such as an internal combustion engine, to a variable load, such as the wheel or wheels of a vehicle or locomotive that will automatically compensate for various changing conditions in practical use and permit the realization of the operating characteristics of the prime mover itself. Another object is to provide a power transmission between a gas or oil internal combustion engine and a load that will permit of closely matching the power output-speed characteristic of the engine, even though the varying conditions met with in practice tend to cause departures from such operating characteristic. Another object is to provide efficient and rugged apparatus for controlling the speed of moving machinery. Another object is to provide a system and apparatus of the above-mentioned character that will be well adapted to meet the varying conditions of practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing, in which I have shown one of various possible embodiments of my invention, Figure 1 shows diagramatically the apparatus and circuit arrangements, and Figure 2 shows graphically the operating characteristic of certain portions of the electrical circuits.

Referring now to Figure 1 of the drawing, I have shown a prime mover preferably in the form of a gas or oil internal combustion engine 10 which is to drive a load diagrammatically indicated as a wheel or wheels 11 of a vehicle, such as a locomotive. The engine 10 drives a generator 12, the output of which is supplied to a motor 13, preferably of the series type, and connected in any suitable manner to turn the driving wheel or wheels 11 of the vehicle. The generator 12 is provided with an exciting field winding 14 excited and controlled in a manner more clearly described below.

The field winding 14 of the main generator 12 is preferably excited from a separate source, conveniently taking the form of a generator 15, driven by the shaft 16 of the engine 10, and connected by conductors 17 and 18, through an automatic switch 19, to a train line 20—21. The field winding 14 of the main generator 12 is connected across the train line 20—21 by conductors 22—23, respectively, but preferably through a variable resistance desirably taking the form of a compressible carbon pile 24.

Preferably, also, the generator 15 is regulated to maintain the voltage of its output substantially constant, and conveniently the field winding 25 of the generator 15 is connected in series with a carbon pile 26, the pressure on which is controlled by a coil 27 acting through the core 28 and lever 29, against the action of an adjustable spring 30, upon the free or unanchored end of the carbon pile 26. The coil 27 is connected across the terminals of the generator 15 so as to be voltage responsive and to control the excitation of the generator 15 in such a manner as to maintain the voltage thereof, and hence the voltage across the train line 20—21, substantially constant.

Various auxiliary devices may be operated from the train line 20—21 and by way of example I have shown a storage battery 31 and lamps 32 connected to be operated from the train line 20—21.

The carbon pile 24 in the circuit of field winding 14 of the main generator 12 has its free or unanchored end acted upon by a bell crank 32 pivoted at 33 so that movement of the bell crank lever in clockwise direction compresses the carbon pile 24 and movement in counter-clockwise direction about its pivot 33 lessens the pressure on the carbon pile 24.

A polyphase induction motor, generally indicated at 34 and preferably three-phase, controls the pressure on the carbon pile 24 conveniently by means of a cam 35 connected to the shaft 36 of the rotor 37 of the motor 34. A spring 38 holds the bell crank lever 32 in contact with the cam 35 while an adjustable spring 39, conveniently connected to the cam 35, tends to swing the latter in a direction (clockwise direction, as viewed in the drawing) normally to relieve the pressure on the carbon pile 24 and thus to increase the resistance thereof.

The rotor 37, when sufficient torque is exerted thereon to overcome the spring 39, swings the cam 35 in counter-clockwise direction and thus to cause the bell crank lever 32 to swing in clockwise direction and increase the pressure on the carbon pile 24.

The motor 34 may be of either the wound rotor type or the squirrel cage rotor type, and by way of illustration I have shown the motor as being of the latter type. It has, therefore, the squirrel cage motor 37 and, being preferably three-phase, as above noted, is provided with stator windings 40, 41 and 42, which may be either Y-connected or delta-connected. Illustratively, I have shown these windings as delta-connected.

The motor 34 receives its energy from a three-phase alternator, the frequency of which varies with the speed of drive of the engine 10 and generator 12. Conveniently, the alternator is driven from or by the shaft 16 and in order to achieve certain other advantages I prefer to excite the alternator from a source of direct current, the potential of which varies with the speed of the engine 10 and the generator 12. Hence, I prefer to embody the alternator and its source of exciting current into a single machine, generally indicated at 43; this machine has an armature driven from or by the shaft and provided with a commutator 43$^a$ from which the exciting field winding 43$^b$ is supplied with direct current, preferably through an adjustable resistance 44; the armature of the machine 43 is provided with slip rings 43$^c$, 43$^e$ and 43$^f$ from which three-phase energy may be taken by suitable brushes.

The brushes coacting with the slip rings of the alternator 43 are connected to the polyphase motor 34, but the circuit supplied by the alternator is made to have certain characteristics whereby a change in impedance of the output circuit of the alternator accompanies a change in frequency of that output.

Preferably, therefore, I connect one slip ring brush of the alternator to a terminal of the motor 34, as by conductor 45, but in this conductor I insert a variable inductance 46 in a variable condenser 47. Another brush from the alternator 43 is connected by conductor 48 to another terminal of the induction motor 34, but through a variable condenser 49 and a variable inductance 50. Similarly, the remaining slip ring brush of the alternator 43 is connected by a conductor 51 to the remaining terminal of the motor 34, but through a variable condenser 52 and a variable inductance 53.

The variable inductances 46, 50 and 53 may be of any suitable type, and by way of illustration I have shown them as having movable iron core 54, 55 and 56 mechanically and preferably non-magnetically connected, as by member 57, to be movable as a unit so that the three inductances may be simultaneously varied.

Also, it might at this point be noted that the member 57, which controls the movement and position of the cores of the variable inductances, is connected by a rack 58 to a meshing gear sector 59 manually controlled by a hand lever 60 which also and preferably controls the throttle valve 61 in the fuel supply conduit 62 leading to the engine 10 so that a change in the setting of the throttle valve also changes the value of the inductances 46—50—53.

Assuming now that the throttle valve 61 has been set for a given power output of the engine 10 and that correspondingly the movable cores of the variable inductances 46, 50 and 53 have been given a corresponding position, the constants of the output circuit of the alternator 43 are given such values, as by predetermination of the inductances 46—50—53 for that setting, or by adjustment of the capacities 47—49—52, or both, that this output circuit is tuned to be resonant at a frequency somewhat above that frequency which the alternator 53 produces at the speed at which it is desired to have the engine 10 operate for the given throttle setting. For example, referring to Figure 2, let it be assumed that the frequency F is the frequency of the alternator 43 when driven by the engine 10 at the intended speed of the latter. The constants of the alternator output circuit are adjusted or predetermined, as above pointed out, so that this circuit has a resonance characteristic somewhat as is shown by the curve A of Figure 2, where resonance is achieved at a frequency $F_r$, and hence upon a sloping portion of the resonance characteristic, the sharpness, and hence the slope, of which characteristic, may, of course, be predetermined to suit any desired conditions.

The curve A, to either side of the frequency F, indicates also, inversely, the change in impedance, with change in frequency, of the output circuit to which the alternator 43 is connected. Should, therefore, the engine 10 and generator 12 diminish in speed as, for example, due to the load on the generator 12 increasing, as might be caused when the vehicle starts the ascent of an up-grade, the frequency of the current output of the alternator 43 diminishes, thus causing the system to operate on the characteristic A of Figure 2, but the portions to the left of the frequency F. The current supplied to the motor 34 is thus diminished, due to the increasing impedance in the alternator output circuit, and the spring 39, acting on the cam 35, can overcome the diminished torque of the motor 34, swing the cam in clockwise direction, and thus lessen the pressure on the carbon pile 24. The excitation supplied to the field winding 14 of the main generator 12 is thus diminished, the output of the generator 12 is cut down, and the engine 10, being thus relieved of the otherwise additive load, begins to speed up, the frequency of the output of the alternator 43 correspondingly increasing until a frequency F (Figure 2) is reached, at which the torque of the motor 34 is just sufficient to balance the action of the spring 39.

Should the engine over-step in speed so that the frequency of the alternator 43 is greater than the frequency F, the system begins to operate on that portion of the characteristic A to the right of the frequency F (Figure 2) and the correspondingly diminished impedance at these higher frequencies in the output circuit of the alternator 43 permits the current to the motor 34 to increase sufficiently so that the motor itself can overcome the action of the spring 39, swing the cam 35 in a direction to increase the pressure on the carbon pile 24, thus increasing the excitation of the main generator 12, increasing its output, and the thus increased load on the engine 10 causing the latter to slow down. Thus, the speed of the generator 12 and of the engine 10 is maintained at a value such that the frequency of the alternator 43 is substantially the selective frequency F.

Accompanying the above-mentioned actions is a highly advantageous coaction between the characteristics of the motor 34 and the characteristics of the alternator 43. The motor 34, as already above noted, is an induction motor and preferably a polyphase induction motor; its torque, and hence the effort it can exert upon the cam 35, is proportional to the square of the impressed voltage. Now, the voltage of the output of the alternator 43, as already hereinabove noted, varies with the speed of drive of the engine 10 and, moreover, varies at a rate greater than the first power of the speed of rotation.

Due to this coaction, any tendency to depart in a downwardly direction from the frequency F of Figure 2 is accompanied by a rapid decrease in the terminal voltage of the alternator 43, and hence by a decrease in the torque of the motor 34 at a rate that is proportional to the square of the voltage of the alternator 43. Thus, the spring 39 has its opposition, represented by the torque of the motor 34, rapidly diminished, due to these considerations, as well as due to the resonant characteristics above described, and the spring 39 is thus promptly brought into action to vary the resistance 24.

Conversely, when the speed increases beyond a frequency F, the voltage of the alternator 43 rapidly rises and the torque of the motor 34, proportional to the square of the impressed voltage, increases so rapidly that the spring 39 can be promptly overcome and the motor 34 can readjust the value of the resistance 24. Thus, the rapidly rising characteristic of voltage-speed of the alternator 43 coacts to achieve highly sensitive regulation.

Should it be desired to cause the apparatus to operate at a different speed, for a given throttle adjustment of the engine 10, the constants in the output circuit of the alternator 43 are changed correspondingly as, for example, by adjustment of the condensers 47, 49 and 52, thus to shift the characteristic A to the right or left along the frequency scale, all as seen in Figure 2, it being pointed out that the magnitude of the current to the motor 34, necessary to balance the spring 39, being represented by the ordinate B of Figure 2.

Since, as is oftentimes the case, the power output-speed characteristic of an internal combustion engine is such that the engine should operate at a different speed for different outputs thereof, I prefer to cause a change in the standard of speed operation of the engine 10 and generator 12 when the throttle valve 61 is adjusted, as by the handle 60, to change the fuel supply to the engine 10, and hence to change its power output. Actuation of the handle 60 not only changes the adjustment of the throttle valve 61, but also changes the constants of the output circuit of the alternator 43, illustratively as by changing the inductances 46, 50 and 53, the actuation of the throttle valve causing a shifting of the iron cores of these inductances. Thus, I am enabled to shift the characteristic A of Figure 2 up or down the frequency scale in accordance with increased or decreased power outputs of the engine 10, or vice versa, depending upon power output-speed characteristic of the engine. The effect of shifting this characteristic A, in achieving a different standard of speed operation, will be clear in view of what has hereinabove been set forth.

It might be noted that, where the motor 34 is of the wound rotor type, I may determine and vary the resonant characteristics of the output circuit of the alternator 43 by associating inductances or condensers, or both, in the circuit of the rotor to which these devices may be connected through the usual slip rings.

It will thus be seen that there has been provided in this invention a system and apparatus in which the various objects hereinbefore noted, as well as many thoroughly practical advantages, are successfully achieved. It will be seen that the invention is of a thoroughly practical character and well adapted to meet the varying conditions of hard practical use.

I make no claim herein to the structural and functional features interrelating the carbon pile 24 with the polyphase control of the pressure thereof inasmuch as I have made those and other features the subject matter of, and have claimed them per se in my co-pending application Serial No. 509,460, filed January 17, 1931, entitled "Regulation of alternating current circuits".

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim:

1. In apparatus of the character described, in combination, a prime mover, a generator, means forming an electrical load for said generator, means for controlling the power supplied to said load, means supplying an alternating potential, the frequency and magnitude of which vary with changes in speed of said prime mover, electromagnetic means for actuating said control means, said electromagnetic means varying in effectiveness with the square of the voltage applied thereto and being connected to be responsive to said alternating potential, and means causing the alternating current supplied to said electromagnetic means to vary with the frequency.

2. In apparatus of the character described, in combination, a prime mover, a generator, means forming an electrical load for said generator, means for controlling the power supplied to said load, means supplying an alternating potential, the frequency and magnitude of which vary with changes in speed of said prime mover, electromagnetic means for actuating said control means, said electromagnetic means varying in effectiveness with the square of the voltage applied thereto and being connected by means of a circuit to be responsive to said alternating potential, and means interposed between said electromagnetic means and said alternating potential supplying means adapted to cause variation in the impedance of said interconnecting circuit with changes in the frequency.

3. In apparatus of the character described, in combination, a prime mover, a generator, means forming an electrical load for said generator, means for controlling the power supplied to said load, means supplying an alternating potential, the frequency and magnitude of which vary with changes in speed of said prime mover, electromagnetic means for actuating said control means, said electromagnetic means varying in effectiveness with the square of the voltage applied thereto and being connected by means of a circuit to be responsive to said alternating potential, and means making the circuit of the alternating current supplied to said electromagnetic means resonant at a frequency adjacent that frequency corresponding to the speed at which said prime mover is to run.

4. In apparatus of the character described, in combination, a prime mover, a generator, means forming an electrical load for said generator, means for controlling the power supplied to said load, means including an interconnecting circuit supplying an alternating potential, the frequency and magnitude of which vary with changes in speed of said prime mover, an induction motor for actuating said control means, and means interposed between said induction motor and said source of alternating potential adapted to cause variation in the impedance of said interconnecting circuit with changes in frequency.

5. In apparatus of the character described, in combination, a prime mover, a generator, means forming an electrical load for said generator, means for controlling the power supplied to said load, a source of polyphase alternating potential, the frequency of which varies with the speed of said prime mover, and a polyphase motor supplied with energy thereby for actuating said control means.

6. In apparatus of the character described, in combination, a prime mover, a generator, means forming an electrical load for said generator, means including a polyphase motor for controlling the power supplied to said load, a polyphase alternating current generator, the frequency of which varies with change in speed of said prime mover, and means connecting said polyphase generator to said polyphase motor varying in impedance with change in frequency of the current passing therethrough.

7. In apparatus of the character described, in combination, a prime mover, a generator, means forming an electrical load for said generator, means including a polyphase motor for controlling the power supplied to said load, a polyphase alternating current generator, the frequency of which varies with change in speed of said prime mover, and means forming a circuit tuned to a frequency spaced from the frequency corresponding to the speed at which said prime mover is to operate for connecting said polyphase motor to said polyphase generator.

8. In apparatus of the character described, in combination, a prime mover, a generator, means forming an electrical load for said generator, means including a polyphase motor for controlling the power supplied to said load, a polyphase alternating current generator, the frequency of which varies with change in speed of said prime mover, means forming a circuit tuned to a frequency spaced from the frequency corresponding to the speed at which said prime mover is to operate for connecting said polyphase motor to said polyphase generator, means for controlling the power output of said prime mover, and means responsive to the actuation of said last-mentioned means for tuning said circuit to a different frequency.

9. In apparatus of the character described, in combination, a prime mover, a generator, means forming an electrical load for said generator, means including a polyphase motor for controlling the power supplied to said load, a polyphase alternating current generator, the frequency of which varies with change in speed of said prime mover, means forming a circuit tuned to a frequency spaced from the frequency corresponding to the speed at which said prime mover is to operate for connecting said polyphase motor to said polyphase generator, and means for tuning said circuit to a different frequency.

10. In apparatus of the character described, in combination, a prime mover, a generator, means forming an electrical load for said generator, means for controlling the power supplied to said load, means supplying an alternating current, the frequency of which varies with the speed of said prime mover, electromagnetic means supplied with alternating current from said last-mentioned means and adapted to actuate said control means, and means forming a circuit for controlling the magnitude of the alternating current supplied to said electromagnetic means, said circuit having a resonant characteristic such that the frequency corresponding to that speed at which said prime mover is to operate falls on the sloping portion of the characteristic.

11. In apparatus of the character described, in combination, motive means having a part driven thereby, means for controlling the speed of said motive means, said means including an induction motor for actuating said control means, an alternator driven at a speed partaking of the same changes as said driven part and having its voltage vary with the speed of the latter for energizing said induction motor, and means causing the impedance of the circuit supplied by said alternator to vary with changes in frequency of the current passing therethrough.

12. In apparatus of the character described, in combination, motive means having a part driven thereby, means for controlling the speed of said motive means, said means including an induction motor for actuating said control means, an alternator driven at a speed partaking of the same changes as said driven part and having its voltage vary with the speed of the latter for energizing said induction motor, and means giving the circuit supplied by said alternator a resonant characteristic such that the frequency corresponding to that speed at which said driven part is to operate falls on a sloping part of the resonant characteristic.

13. In apparatus of the character described, in combination, motive means having a part driven thereby, means for controlling the speed of said motive means, said means including an induction motor for actuating said control means, and an alternator driven at a speed partaking of the same changes as said driven part and having its voltage vary with the speed of the latter for energizing said induction motor.

14. In apparatus of the character described, in combination, motive means having a part driven thereby, means for controlling the speed of said motive means, said means including a polyphase induction motor for actuating said control means, a polyphase alternator having the frequency of its output varying with the speed of said motive means, means causing the circuit supplied by said alternator to vary in impedance with changes in the frequency of the output of said alternator, means for changing the standard of operation of said motive means, and means for changing the standard of operation of said impedance-changing means.

15. In apparatus of the character described, in combination, motive means having a part driven thereby, means for controlling the speed of said motive means, said means including a polyphase induction motor for actuating said control means, a polyphase alternator having the frequency of its output varying with the speed of said motive means, means causing the circuit supplied by said alternator to vary in impedance with changes in the frequency of the output of said alternator, means for changing the standard of speed operation of said motive means, and means responsive to actuation of said last-mentioned means for changing the standard of operation of said impedance-varying means.

16. In apparatus of the character described, in combination, motive means having a part driven thereby, means for controlling the speed of said motive means, said means including a polyphase induction motor for actuating said control means, a polyphase alternator having the frequency of its output varying with the speed of said motive means, and means causing the circuit supplied by said alternator to vary in impedance with changes in the frequency of the output of said alternator.

17. In apparatus of the character described, in combination, motive means having a part driven thereby, means for controlling the speed of said motive means, said means including a polyphase induction motor for actuating said control means, a polyphase alternator having the frequency of its output varying with the speed of said motive means, and means giving the circuit supplied by said alternator a resonant characteristic such that the frequency corresponding to the speed at which said driven part is to operate falls to one side of the apex of the resonant characteristic.

18. In apparatus of the character described, in combination, a dynamo electric machine, a carbon pile for controlling the excitation thereof, an alternating current motor for controlling said carbon pile, an alternator, the frequency of which varies with the speed of said machine for supplying current to said motor, and means giving the circuit supplied by said alternator a resonant characteristic such that the frequency corresponding to the speed at which said machine is to operate falls to one side of the resonant characteristic of the circuit.

19. In apparatus of the character described, in combination, a dynamo electric machine, a carbon pile for controlling the excitation thereof, an induction motor for controlling said carbon pile, and an alternator having its potential vary with changes in speed of said machine for supplying current to said induction motor.

20. In apparatus of the character described, in combination, a generator, means including an induction motor the torque of which varies with the square of the applied voltage for controlling the output of said generator, and means supplying said induction motor with an alternating current, the potential of which varies with a function of the output of said generator.

21. In apparatus of the character described, in combination, a dynamo electric machine, means comprising a polyphase winding and a relatively movable core therefor for actuating said excitation control means, and means responsive to changes of speed of said dynamo electric machine for supplying energy to said polyphase winding of said actuating means.

22. In apparatus of the character described, in combination, a dynamo electric machine, means for controlling the excitation thereof, means including a rotatable element for actuating said excitation control means, electro-magnetic means including a polyphase winding associated with said rotatable element, and a source of alternating current varying in frequency with speed of said machine for energizing said electro-magnetic means.

23. In apparatus of the character described, in combination, a dynamo electric machine, means for controlling the excitation thereof, means including a rotatable element for actuating said excitation control means, electro-magnetic means including a polyphase winding associated with said rotatable element, a source of alternating current varying in frequency with speed of said machine for energizing said electro-magnetic means, and means including a variable impedance element for interconnecting said source and said electro-magnetic means.

24. In apparatus of the character described, in combination, a dynamo electric machine, means for controlling the excitation thereof, means including a rotatable element for actuating said excitation control means, electro-magnetic means including a polyphase winding associated with said rotatable element, and a source of alternating current, the value of which varies at a rate greater than the first power of the speed of said machine for energizing said electro-magnetic means.

25. In apparatus of the character described, in combination, a dynamo electric machine, means including a variable resistance element for controlling the excitation thereof, means including a rotatable element for actuating said variable resistance element, electro-magnetic means including a polyphase winding operatively associated with said rotatable element, means for producing a source of alternating potential which varies in magnitude and frequency with the speed of said machine, and means for connecting said electro-magnetic means to said source.

26. In apparatus of the character described, in combination, a dynamo electric machine, means for controlling the excitation thereof, means including a rotatable element for actuating said excitation control means, means including a polyphase winding operatively associated with said rotatable element for operating said actuating means, a source of alternating potential whose characteristics vary with the speed of said machine, and means including a resonant circuit for connecting said means including said polyphase winding to said source.

27. In apparatus of the character described, in combination, a dynamo electric machine, means for controlling the excitation thereof, means including a rotatable element for actuating said excitation control means, means including a polyphase winding operatively associated with said rotatable element for operating said actuating means, a source of polyphase alternating potential whose characteristics vary with the speed of said machine, and means including a resonant circuit for connecting said polyphase winding to said source.

In testimony whereof, I have signed my name to this specification this 14th day of August, 1929.

FRANK W. GODSEY, Jr.